Figure 1:
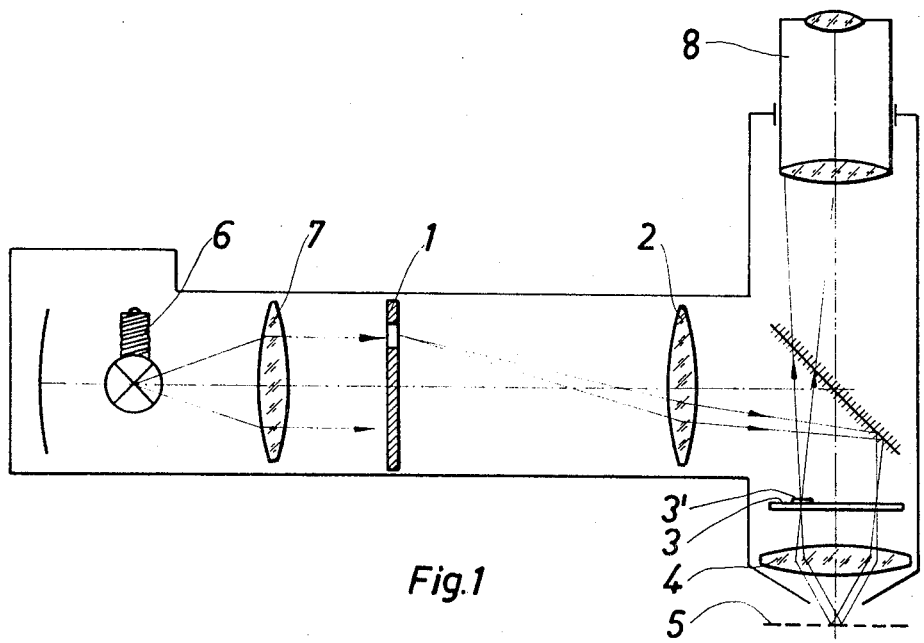

United States Patent
Beyer et al.

[15] 3,637,280
[45] Jan. 25, 1972

[54] DEVICES FOR HIGH-CONTRAST IMAGING OF PHASE OBJECTS IN INCIDENT-LIGHT MICROSCOPY

[72] Inventors: Hermann Beyer; Gunter Schoppe, both of Jena, Germany

[73] Assignee: Jenoptik Jena G.m.b.H., Jena, Germany

[22] Filed: May 12, 1970

[21] Appl. No.: 43,273

[52] U.S. Cl. .................................................. 350/13, 350/91
[51] Int. Cl. ............................................................ G02b 21/14
[58] Field of Search ........................................ 350/12–15, 91

[56] References Cited

UNITED STATES PATENTS

| | | | |
|---|---|---|---|
| 2,553,108 | 5/1951 | Osterberg et al. | 350/13 |
| 2,637,243 | 5/1953 | Marx | 350/13 |
| 2,861,498 | 11/1958 | Klein | 350/13 |

FOREIGN PATENTS OR APPLICATIONS

| | | | |
|---|---|---|---|
| 673,861 | 6/1952 | Great Britain | 350/13 |
| 1,047,363 | 7/1953 | France | 350/13 |

*Primary Examiner*—David Schonberg
*Assistant Examiner*—Paul R. Miller

[57] ABSTRACT

A device for high-contrast imaging of phase objects in incident-light microscopy operates on Kohler's principle of illumination and enables phase contrast images to be obtained with sufficient brightness and without reflexes. The device includes a phase contrast objective, a phase plate with a phase layer, and an aperture diaphragm that corresponds to the phase plate. The phase plate is so located in the rear focal plane of the phase contrast objective that the diaphragm image produced in the focal plane of the objective after reflection on the specimen surface is covered by the phase layer and that the diaphragm image produced directly by an illumination lens appears in a portion of the objective focal plane which is not covered by the phase layer.

5 Claims, 5 Drawing Figures

PATENTED JAN 25 1972  3,637,280

INVENTORS
Hermann Beyer
Junter Schoppe

DEVICES FOR HIGH-CONTRAST IMAGING OF PHASE OBJECTS IN INCIDENT-LIGHT MICROSCOPY

This invention relates to devices for high-contrast imaging of phase objects in incident-light microscopy.

The known phase contrast methods when applied in incident-light analyses suffer from the disadvantage that the microscope objective also acts as a condenser and thus transmits the illumination rays.

As the annular illumination diaphragm cannot be located in the focal plane of the objective, it would necessarily have to be imaged in this plane by one or more illumination lenses, a second image of the diaphragm being produced in the same plane after reflection of the imaging rays by the surface of the specimen under observation. The focal plane of the objective would accordingly have to contain also the phase layer, and the light rays illuminating the specimen surface would all have to traverse this layer. However, as the intended increase of the phase contrast effect permits only approximately 25 to 30 percent of the light to traverse the layer and, in the absence of particular auxiliary means, the remaining light is for the most part reflected, the comparatively dark phase contrast image would be veiled completely by the reflected light from the side of the layer that faces the light source. Two possibilities are known how to avoid this disadvantage. The first possibility is for the reflected light to be reduced either by auxiliary polarization optical means or by special layers of high absorption and little reflection. The second possibility consists in removing the phase plate from the path of illumination rays or, if the type of objective so permits, in placing this plate on a face of a lens that lies in or near the focal plane and is sufficiently curved towards the intermediate image plane. Alternatively, the phase plate may be placed on an additional plate in or near the focal plane. The first-mentioned possibility involves loss of light. The second possibility can be carried into practical effect in two ways, either by means of an intermediate image system that produces an image of the exit pupil at a place where the phase plate can be located, or by displacing the one image of the annular diaphragm in the path of illumination rays from the exit pupil in the direction of the specimen until the other image of this diaphragm lies outside the path of illumination rays at a place where the phase plate can be located, the path of imaging rays remaining unchanged.

The use of an intermediate image is satisfactory theoretically but incurs considerable expenditure, since the correction of the intermediate image system must needs be very good. Displacement of the one image of the annular diaphragm towards the specimen is a departure from Köhler's principle of illumination and involves the risk of an inadequate illumination of the field of view, particularly when high-power objectives are used, so that the image quality is considerably reduced. The provision of the phase plate on a highly curved surface causes the phase layer so to reflect the light that no reflected light can arrive at the intermediate image plane. However, the optical construction necessary in this latter case requires an objective of a particular kind.

The present invention aims at overcoming the foregoing disadvantages by providing a phase contrast device for incident-light microscopy which operates on Köhler's principle of illumination and which by simple means produces high-quality phase contrast images of sufficient brightness without undesired reflection.

To this end, the present invention consists in a device of the foregoing kind which includes a phase plate in or near the rear focal plane of the microscope objective, wherein the aperture diaphragm corresponds to the phase plate and the phase layer is so arranged on the phase plate that the diaphragm image produced in the focal plane of the objective after reflection on the specimen surface is covered by the phase layer and that the diaphragm image produced directly by the illumination lens appears in a portion of the objective focal plane which is not covered by the phase layer.

According to a feature of a preferred form of the invention the aperture diaphragm and the phase layer each comprise one or more annular surfaces with an odd number of symmetrically arranged interrupted annular surfaces, the surfaces of the diaphragm and those of the phase layer alternating with each other.

According to another preferable feature of the invention, the aperture diaphragm and the phase layer each comprise an odd number of sectors in symmetrical relationship to each other, so that the size of the illumination aperture can be controlled by air iris diaphragm.

Figure 2:
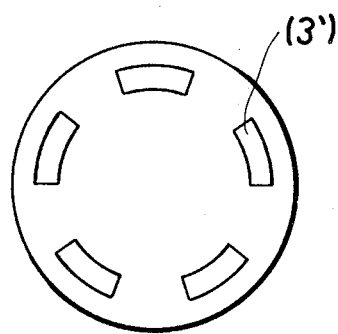
Figure 3:
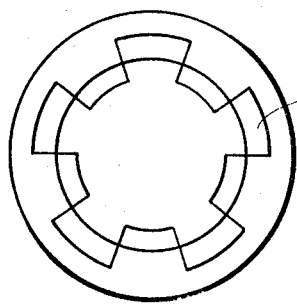
Figure 4:
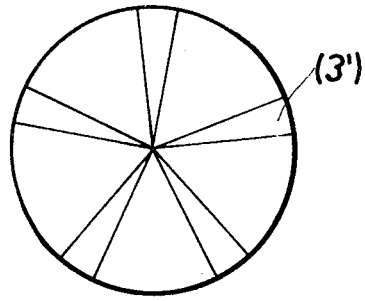
Figure 5:
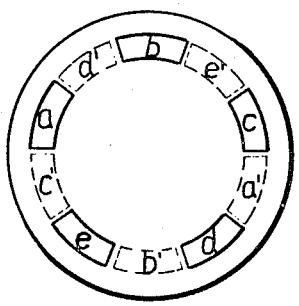

In order that the invention may be more readily understood, reference is made to the accompanying drawings which illustrate diagrammatically and by way of example several aspects thereof, and in which FIG. 1 shows the ray path that images the aperture diaphragm in a microscope operating with incident light, FIGS. 2 to 4 show several forms of phase layers and aperture diaphragms, and FIG. 5 shows the two images of the diaphragm aperture of FIG. 2 in the pupil of a microscope objective, these images being combined in the form of a ring.

In the drawings, a conventional aperture diaphragm 1 (FIG. 1) is replaced by diaphragms corresponding to the phase layers shown in FIG. 2, 3 or 4, Köhler's illumination principle being however maintained. The diaphragms of FIGS. 2 and 4 have an odd number of openings. This applies also to the diaphragm of FIG. 3 that comprises two concentric rings, each of which has an odd number of openings.

In FIG. 1, a first image of the aperture diaphragm 1 in the illumination ray path is produced in the focal plane 3 of a microscope objective 4 by means of a light source 6, a collector 7 and an illuminating lens 2. The diaphragm 1 may be any one of the diaphragms shown in FIGS. 2 to 4. After reflection by the surface 5 of a specimen, a second image of the aperture diaphragm 1 is produced in the focal plane 3 of the objective 4. However, due to the odd number of diaphragm openings, the said second image does not coincide with the first image but is symmetrically reversed by 180° relatively thereto. The two images can be viewed through an eyepiece 8.

A phase plate in the focal plane 3 carries a phase layer 3' that corresponds to the second image of the aperture diaphragm 1 imaged at that plane. The rays reflected by the surface of the specimen, but not the illumination rays incident on the pupil, traverse the phase layer 3', so that there is only very little stray light, as is obvious from FIG. 5, wherein the openings of the diaphragm 1 (as shown in FIG. 2) appearing in the first image as the pupil of the illumination ray path are in the form of an intermitting annulus $a, b, c, d, e$, and wherein the openings of the diaphragm 1 that appear in the second image after reflection by the specimen surface are in the form of an intermitting annulus $a', b', c', d', e'$.

The diaphragm shown in FIG. 2 is a diaphragm having an annular aperture that is interrupted five times, which is an odd number, by spaces each corresponding to 36°. A diaphragm of such design causes the light intensity to be halved relatively to that of a corresponding annular diaphragm. A diaphragm in the shape shown in FIG. 3, however, produces an intensity corresponding to that of the light traversing an annular diaphragm.

The diaphragm of FIG. 4 comprises an odd number of sectors, which are so arranged relatively to each other that the illumination aperture can be controlled by an iris diaphragm or any other exchangeable circular diaphragm without substantially influencing the phase contrast effect.

The present invention makes it possible in a very simple manner to maintain Köhler's principle of illumination and at the same time to obtain a uniformly illuminated high-contrast image field without reflection.

We claim:

1. A device for high-contrast imaging of phase objects in incident-light microscopy, comprising an optical observation system and an illuminating system, the observation ray path and the illumination ray path being in part aligned along a common optical axis by a beam-splitting mirror, a phase plate and an objective and the surface of the object being located along said common optical axis, said phase plate carrying a phase layer and lying near the focal plane of said objective, said illumination ray path traversing a collector, an aperture diaphragm and an illumination lens, said illumination lens imaging said aperture diaphragm via said beam-splitting mirror in the plane of said phase plate, said aperture diaphragm and said phase layer being so coordinated to each other in form and arrangement that the image of said aperture diaphragm lies on a portion of said plate which is not covered by said phase layer and that the rays after traversing said uncovered portion and reflection by the surface of the examined object produce a secondary image of said aperture diaphragm which coincides with said phase layer on said phase plate.

2. A device as claimed in claim 1, wherein said aperture diaphragm comprises an odd number of transparent portions of a circular ring concentric with said optical axis, said portions being separated from each other by opaque spaces, the arc lengths of said opaque spaces being approximately equal to the arc lengths of said portions, and said phase plate carrying a phase layer conjugated to said aperture diaphragm.

3. A device as claimed in claim 2, wherein said aperture diaphragm and said phase layer comprise a plurality of systems of circular ring portions of differential mean diameters, said diameters differing from each other by at least the breadth of the circular ring portions.

4. A device as claimed in claim 1, wherein said aperture diaphragm and said phase layer comprise an odd number of sectors separated from each other by opaque spaces.

5. A device as claimed in claim 4, wherein an iris diaphragm variable in size is located near the field of said aperture diaphragm.

* * * * *